United States Patent Office
3,826,727
Patented July 30, 1974

3,826,727
BRIGHTENING COLORED α-AMINOCARBOXYLIC ACIDS AND DERIVATIVES THEREOF
Helmut Daut, Weisenheim am Sand, and Uwe Soenksen and Walter Wielant, Wiersdorff, Ludwigshafen, Germany, assignors to Badische Anilin- & Soda-Fabrik Aktiengesellschaft, Ludwigshafen (Rhine), Germany
Filed Feb. 4, 1972, Ser. No. 223,517
Claims priority, application Germany, Feb. 11, 1971, P 21 06 415.3
Int. Cl. B01j 1/10
U.S. Cl. 204—158 R
6 Claims

ABSTRACT OF THE DISCLOSURE

A process for brightening colored α-aminocarboxylic acids and their derivatives which bear at least one carboxyl group or its anion in the α-position on each basic nitrogen atom by means of high intensity radiation.

---

Figure 1:
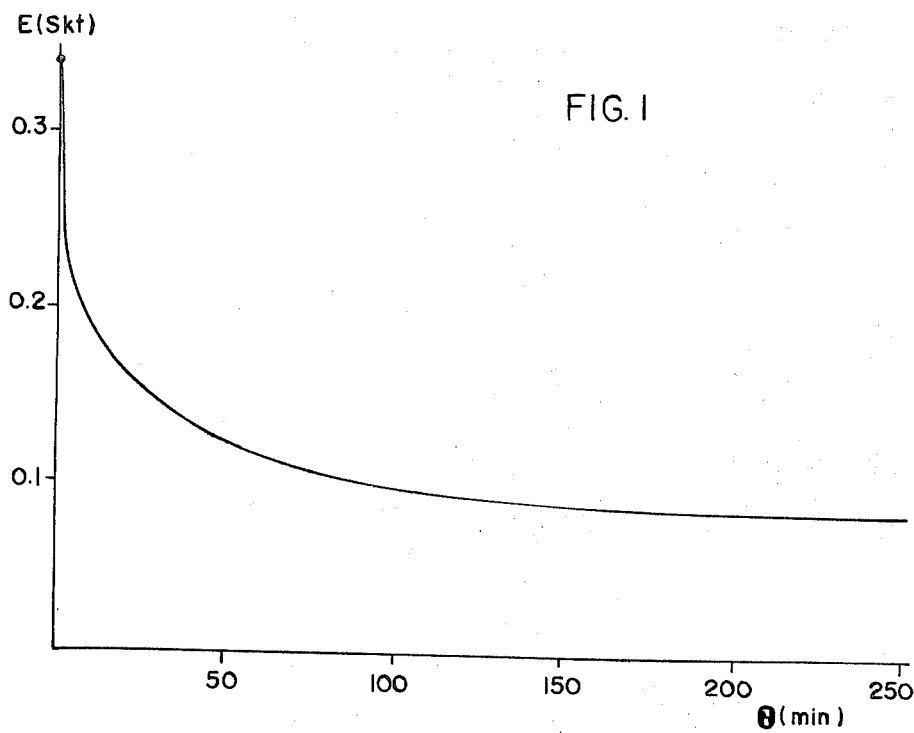

This invention relates to a process for brightening colored α-aminocarboxylic acids and their derivatives which bear at least one carboxyl group or its anion in the α-position on each basic nitrogen atom by means of high-intensity radiation.

The reaction of for example amines or ammonia with formaldehyde and hydrocyanic acid or cyanides is known to result to a large extent in the above compounds. The reaction has hitherto been carried out in a number of stages, the intermediates being isolated. It is particularly advantageous because it is more economical, for the isolation of intermediates to be dispensed with in all processes. In many cases however more or less strongly colored products are then obtained.

Since the abovementioned aminocarboxylic acids and their derivatives are used to an increasing extent as additives to industrial cleansers and domestic detergents, high standards are applied as regards the color of these aminocarboxylic acid derivatives. These have hitherto only been achieved at considerable expense, for example by isolating intermediate compounds.

There has been no dearth of attempts to develop special methods of making individual representatives. Thus for example a process for the production of nitrolotriacetic acid is proposed in German Laid-Open Specification No. 1,813,718 according to which the solution obtained is brightened with hydrogen peroxide in combination with active carbon. This has the disadvantage however that the active carbon has to be removed again by filtration. Moreover hydrogen peroxide involves a great risk because it has to be metered very accurately since when too much of it is used there is often a considerably stronger discoloration of the product.

This invention has as its object the brightening of α-aminopolycarboxylic acids obtained by conventional methods by a simple operation.

The process of this invention for brightening α-aminocarboxylic acids and their derivatives which have the structural unit of the formula:

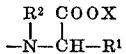

in which $R^1$ is hydrogen or unsubstituted or substituted o-hydroxyphenyl, $R^2$ is hydrogen, $CH_2CH_2OH$ or $$CH_2COOX$$

and X is sodium, potassium or hydrogen, comprises exposing the aqueous solution or suspension of the compound to the influence of light radiation of the wavelength of less than 7000 A.

Irradiation is preferably carried out in the presence of oxygen, a gas containing elementary oxygen or a substance which gives off oxygen.

The said process is particularly well suited to the decolorizing of, for example, ethylenediaminetetraacetic acid, but other substances which contain the above structural unit may very well be subjected to the process of the invention. Examples of substances suitable for the process of the invention are those having the following formulae:

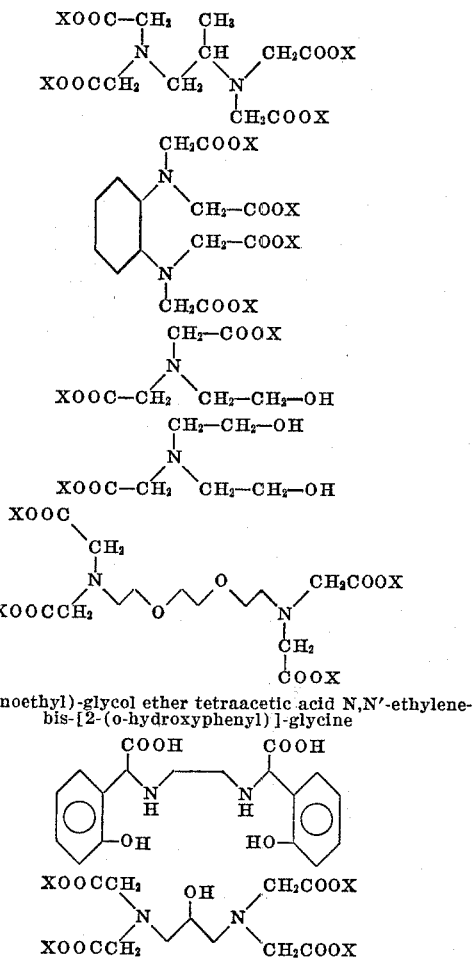

bis-(aminoethyl)-glycol ether tetraacetic acid N,N'-ethylene-bis-[2-(o-hydroxyphenyl)]-glycine Those compounds having the abovementioned structural unit are moreover of particular industrial interest in which in the formula $R^1$ is hydrogen and $R^2$ is $$CH_2CH_2OH$$

or $CH_2COOX$ and which moreover have combined to the nitrogen atom the radical —$CH_2COOX$ or the grouping of the formula

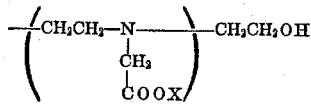

or

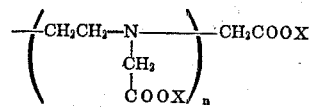

in which n is one of the integers 1 to 10.

Compounds of this type are for example nitrilotriacetic acid, diethylenetriaminepentaacetic acid and their sodium salts and particularly sodium N-oxyethylethylenediaminotriacetate.

Similarly solutions of the aminocarboxylic acid derivatives which are strongly contaminated with byproducts or mixtures of the aminocarboxylic acid derivatives with one another may also be used.

The α-aminocarboxylic acids or their derivatives may be used for the photochemical bleaching process in the form of their aqueous or water-containing solutions, but crystal suspensions in water or homogeneous or heterogeneous mixtures with organic solvents such as methanol, benzene, cyclohexane, glycol dimethyl ether and formamide are also amenable to the process of the invention. Usually the α-aminocarboxylic acid solutions are used as obtained and dilution is dispensed with for economical reasons. Particularly in the case of solutions having only discoloration it may be advisable to concentrate the solutions prior to irradiation. In particular cases it may be convenient for the α-aminocarboxylic acids or derivatives to be partially crystallized and the resultant moist crystal suspension to be irradiated or the separated mother liquor and if desired the redissolved crystals to be irradiated separately.

The process may also be used for solutions which have previously been treated by another bleaching method. It is also possible however to carry out the bleaching by another method, such as treatment with $Na_2O_2$/active carbon while exposing to light at the same time or it may follow the photochemical process.

The concentration of the solutions is advantageously from 3 to 60% by weight—calculated on the solution—but in principle it is also possible to bleach out more highly concentrated or more dilute solutions by the irradiation. The optimum concentration is determined by parameters such as depth of penetration of the active rays, solubility of the α-aminocarboxylic acid derivative, viscosity of the solution or by the solubility for oxygen. The most favorable conditions in each case can easily be determined by a simple experiment. Economy also has to be taken into account in the achievement of the optimum concentration.

The process of bleaching the α-aminocarboxylic acids and their derivatives in accordance with the invention may be carried out at any pH value. For example in the case of nitrilotriacetic acid the trisodium salt, the disodium salt, the monosodium salt and the free acid itself may be smoothly bleached in solution or suspension by irradiation according to the invention. It is not necessary to limit the reaction to a specific pH range.

In principle all light sources which emit light in the wavelength range below 7000 A. are suitable for the process. It is preferable to use light rays with wavelengths of from 2500 to 7000 A., and in the case of the individual representatives the optimum lower limit may vary between 2500 and 4000 A. For carrying out the process on an industrial scale, for example mercury vapor high pressure lamps, mercury vapor extreme pressure lamps, xenon arc lamps, halogen incandescent lamps and fluorescent tubes are suitable. Mercury vapor high pressure lamps are however preferably used. In individual cases it can easily be established by preliminary experiments in which wavelength range the irradiated light promotes bleaching of the discolored solutions.

For example light of the wavelength from 3000 to 7000 A. has proved to be particularly favorable in the case of nitrilotriacetic acid. For reasons of economy it is therefore advisable to correlate the emission of the light source to the optimum effective absorption spectrum of the discolored solution. Examples of suitable measures for the purpose are doping mercury vapor high pressure lamps with halides of gallium, indium, zinc, tin, sodium, chromium, yttrium or holmium alone or mixed together.

Adjustment of the effective absorption spectrum may how however also be achieved with luminescent liquid or solid light filter layers, for example optical brighteners or uranyl glasses which transform light of short wavelength into light of longer wavelength and thus improve the efficiency of the lamps.

Since shortwave light below 3000 to 4000 A. in the case of individual representatives of the abovementioned substances may cause marked deeping or change in color or retardation of the bleaching it is convenient in these cases to absorb the undesired wavelength by liquid or solid filter systems or to convert them by liquid or solid luminescent light filters into light of the desired wavelengths. The lower limit of the optimum wavelength of the above definition is adjusted to values of at least 2500 to 4000 A.

The process according to the invention may in principle be carried out alone without adding gas or under inert gases such as nitrogen or argon. Particularly good bleaching is achieved however in the presence of oxygen, gas containing elementary oxygen or substances yielding oxygen. The latter may be inorganic substances or mixtures of substances, for example sodium peroxide, sodium perborate, potassium persulfate, hydrogen peroxide or sodium hypochlorite and sodium peroxide, or organic peroxide compounds, for example peroxycarboxylic acids such as perbenzoic acid or peracetic acid, hydroperoxides such as hydrogen peroxide, t-butyl hydroperoxide or lauroyl hydroperoxide, or endoperoxides such as anthracene endoperoxide, which may be added as such or may be produced in situ from the appropriate precursors such as are obtained or occur in conventional methods.

The decision whether or how the photoreaction is to be carried out for example in the presence of elementary oxygen or a substance yielding oxygen depends on the individual case and can be made after simple preliminary experiments. In some cases, particularly where there is marked discoloration and/or high viscosity of the solutions or suspensions to be bleached with low solubility of oxygen in such solutions, in the bleaching of suspensions or crystal sludges, it is advantageous to mix the gas component as intensely as possible with the aqueous phase. In principle it is possible however to carry out the decoloration with only the atmospheric oxygen dissolved in the aqueous phase being present. It may then be necessary to use an increased oxygen pressure or to have present a solubilizer such as methanol, glycol dimethyl ether or dimethylformamide.

To combine irradiation of the solutions with the passage therethrough of oxygen or a gas containing oxygen is particularly advantageous for the entrainment of the ammonia and/or amines occurring as byproducts in the various methods or production.

The process of the invention may be carried out at various temperatures. The choice of the temperature is governed by solubility, viscosity and other physical parameters. The upper temperature is advantageously about 100° C. (boiling point of water) and the lower limit about −10° C. It is possible in principle to go beyond these temperature limits in individual cases provided the viscosity or evaporation of solvent do not make operation in these temperature ranges inconvenient. In individual cases the most favorable temperature for the reaction may be determined by simple preliminary experiment. The process of the invention may also be carried out in principle in the presence of photosensitizers which promote photooxidative processes by the formation of peroxides, hydroperoxides or peroxy radicals. Examples of these are ketones such as acetone, benzophenone or fluorenone or aldehydes such as isobutyraldehyde and also sensitizers producing singlet oxygen such as rose bengal, eosin, methylene blue and 9,10-diphenylanthracene. Colored sensitizers should be present in heterogeneous phase (liquid/liquid or liquid/solid) unless they can be removed from the aqueous phase or converted into colorless secondary products. These sensitizers are added to the aqueous solution (present at about 20 to 60% strength) in concentrations of from 0.005 to 0.05%.

The photochemical process may be carried out industrially by any appropriate method. The light source may be located outside the reactor, it may be arranged in the gas space above the surface of the liquid to avoid corrosion, or may be installed as a submersible lamp in a conventional arrangement. The most favorable arrangement may easily be discovered by simple preliminary experiments, as may also be shape and dimensions of the reactors. The solution to be decolored should be adequately mixed in the reactors. This may be done by conventional methods. Examples of suitable equipment are mechanical stirrers but it is usually more advantageous to combine the internal circulation of the contents of the reactor with the introduction of gas such as is easily possible on the principle of the air-lift pump, with an impulse exchange tube or with jets of the type of the venturi tube. It is also possible in principle to make use of intense circulation for example of a slip stream through an external circulation which can be used at the same time for heat control and for gassing the reaction material.

The process may be carried out batchwise or continuously, and photoreactors may be operated in series or in parallel.

The new process is elucidated by the following Examples but is not limited to these arbitrarily chosen embodiments. The result of the photochemical decoloration may be read off against the original solution by the decrease in the absorbances measured at 4000 A. in a layer 2 cm. in thickness.

EXAMPLE 1

A submersible lamp unit of conventional design and made of Duran is charged with 200 ml. of a 40% solution nitrolotriacetate which is irradiated with the filtered light of a 300 watt mercury vapor high pressure lamp while slowly passing oxygen therethrough. A 5% $KNO_3$ solution in a layer 0.5 cm. in thickness is used as the cooling and filtering solution.

The relationship between temperature and photoreaction may be seen from the following Table:

| T, °C. | $A_o$* | A (30 min.) | A (480 min.) |
|---|---|---|---|
| 24 | 1.01 | | 0.220 |
| 68 | 1.01 | 0.515 | 0.110 |
| 87 | 1.01 | 0.510 | 0.140 |

*$A_o$=Absorbance of the original solution.

EXAMPLE 2

200 ml. of strongly discolored sodium nitrilotriacetate solution is irradiated as in Example 1, the effect of different filter solutions, temperatures, types of burner and flushing gas being investigated. The absorbance of the original solution is 1.01. The following Table summarizes the results. The period of treatment in each case is five hours. The following abbreviations are used:

B=Burner; Temp.=temperature in °C.; FG=flushing gas; A=absorbance; Hg=300 watt mercury vapor lamp without any addition; Tl (Ga)=300 watt mercury vapor lamp to which Tl (Ga) has been added.

| B | Temp. | Filter | FG | A |
|---|---|---|---|---|
| Hg | 24 | 5%$KNO_3$/$H_2O$ | $N_2$ | 0.76 |
| Hg | 24 | 5%$KNO_3$/$H_2O$ | Air | 0.52 |
| Hg | 24 | 5%$KNO_3$/$H_2O$ | $O_2$ | 0.27 |
| Hg | 24 | 5%$KNO_3$/$H_2O$ | Air | 0.22 |
| Hg | 50 | 5%$KNO_3$/$H_2O$ | $O_2$ | 0.15 |
| Hg | 24 | 2% $K_2CrO_4$/$H_2O$ | $O_2$ | 0.89 |
| Hg | 24 | $H_2O$ | $O_2$ | 0.51 |
| Hg | 24 | 2% $NaNO_2$/$H_2O$ | $O_2$ | 0.31 |
| Hg | 24 | 5% $KNO_3$/$H_2O$ | $O_2$ | 0.27 |
| Tl | 50 | 5% $KNO_3$/$H_2O$ | $O_2$ | 0.14 |
| Ga | 50 | 5% $KNO_3$/$H_2O$ | $O_2$ | 0.11 |

EXAMPLE 3

1600 ml. of a 45% solution in water of tetrasodium ethylenediamine-tetraacetate (Ao=0.405) is irradiated in a submersible lamp unit in a layer 3.5 cm. in thickness using a 300 watt mercury vapor high pressure lamp while passing oxygen therethrough at 70° C. A 2% $NaNO_2$ solution is used as light filter. The absorbance is decreased to 0.22 after thirty minutes, and to 0.118 after five hours. When a 5% $KNO_3$ solution is used as light filter the absorbance is decreased to 0.235 after five hours. When $NaNO_2$ is used as light filter and air as flushing gas, only A=0.186 is reached after five hours.

EXAMPLE 4

A 45% solution of tetrasodium ethylenediaminetetraacetate ($A_o$=0.36) is irradiated in a continuously operated apparatus of Duran glass. The total contents are 5.5 liters. The solution is circulated by means of a pump through an overflow vessel, a heat exchanger and the photoreactor in turn. The irradiation vessel is a cylindrical glass vessel coated with metal in which the colored solution in a layer 7 cm. in thickness is exposed to the filtered light of a light source arranged concentrically. In addition to the Duran glass of the double-walled lamp shaft, a filter solution in water of 0.5% of $NaNO_2$ is used which cools the lamp at the same time. The photoreaction is carried out in the presence of oxygen which is blown into the reactor at the rate of 15 liters per hour. Supply takes place through a dosing pump; the level in the reactor and consequently the contents of the reactor are kept constant by the overflow vessel. The temperature is 57° C.

FIG. 1 shows the course of the absorbance A in relation to the mean residence time.

EXAMPLE 5

A 45% aqueous solution according to Example 4 without supply but under otherwise identical conditions is irradiated in the apparatus described in Example 4, the light source being successively a mercury vapor high pressure lamp with added gallium, one with added thallium and one without any addition.

Figure 2:
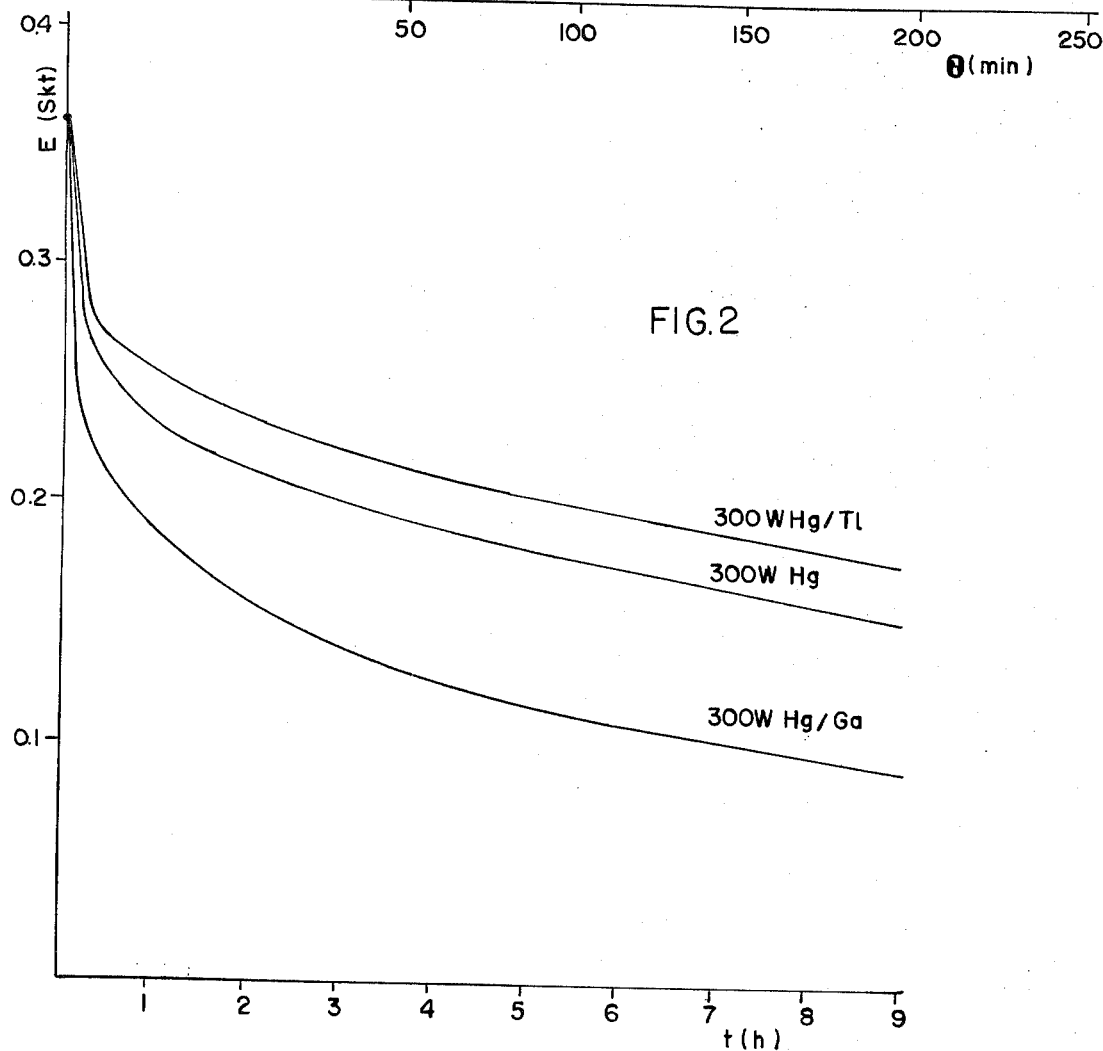

FIG. 2 shows the course of absorbance with time.

EXAMPLE 6

350 ml. of an aqueous solution of sodium diethylenetriaminopentacetate is irradiated at 50° C. with the light from a 300 watt mercury vapor high pressure lamp in a submersible lamp unit while passing 15 liters of oxygen therethrough per hour. A 0.75 cm. layer of a 2% aqueous $NaNO_2$ solution serves as a light filter. After irradiation for one hour the absorbance has been decreased from 0.129 to 0.084.

EXAMPLE 7

A 40% aqueous solution of the trisodium salt of nitrilotriacetic acid (A=0.66) is irradiated at 60° C. in the apparatus described in Example 4 using a 0.5% $KNO_3$ solution as a light filter, the light source being a 300 watt mercury vapor high pressure lamp. In a batchwise experiment the absorbance decreases as follows (0, 1, 7, 21 hours): 0.66; 0.285; 0.125.

When the same solution has 0.02% of isobutyraldehyde added to it (as a 2% solution in a mixture of 2 parts of methanol and 5 parts of water) prior to irradiation, the corresponding absorbance values are: 0.66; 0.505; 0.23; 0.10.

EXAMPLE 8

A submersible lamp apparatus is charged with 850 ml. of aqueous trisodium nitrilotriacetate solution which has been obtained by hydrolysis of nitrilotriacetonitrile. The slightly discolored solution is irradiated at 50° C. with the light from a 300 watt mercury vapor high pressure lamp (filtered through 2% $KNO_3$ solution) while passing oxygen through. The solution is substantially decolored after only thirty minutes and the absorbance has fallen to 0.069.

EXAMPLE 9

A submersible lamp unit of conventional design of Duran glass is charged with 250 ml. of 45% aqueous solution of tetrasodium ethylenediaminetetraacetate which, after 250 mg. of $Na_2O_2$ has been added is irradiated at 50° C. with the light from a mercury vapor high pressure lamp (type: Philips HPK 125). A 0.5% $NaNO_2$ solution is used as a light filter.

The absorbance of the original solution (0.455) has fallen after six hours' irradiation to 0.175.

EXAMPLE 10

A 45% aqueous solution of tetrasodium ethylenediaminotetracetate containing about 20% of solids is irradiated at 50° C. in the apparatus described in Example 3 while passing oxygen through. Seven hours later the absorbance has fallen from 0.34 to 0.124.

EXAMPLE 11

A mixture of 150 ml. of methanol and 1450 ml. of aqueous trisodium nitrilotriacetate solution (A=0.82) is irradiated in the apparatus specified in Example 3. After six hours the absorbance is 0.374.

We claim:

1. A process for brightening α-amino-carboxylic acids or derivatives thereof which have the structural unit of formula:

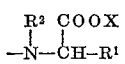

in which $R^1$ is hydrogen or unsubstituted or substituted o-hydroxyphenyl, $R^2$ is hydrogen or $CH_2CH_2OH$ or $CH_2COOX$ and X is sodium, potassium or hydrogen, which process comprises exposing a contaminated and colored solution or suspension of a compound having said structural unit to radiation of a wavelength of 2500 to 4000 A. from an artificial light source at an intensity and for a period of time sufficient to substantially decolorize said solution or suspension.

2. A process as claimed in Claim 1 wherein the process is carried out in the presence of oxygen, gas containing elementary oxygen or a substance yielding elementary oxygen.

3. A process as claimed in Claim 1 wherein the radiation is carried out in the presence of a photosensitizer.

4. A process as claimed in Claim 1 wherein said structural unit is attached by its nitrogen atom to one of the radicals:

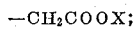

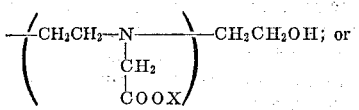

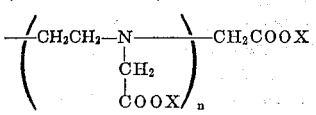

wherein X has the same meaning as in Claim 1 and $n$ is an integer of 1 to 10.

5. A process as claimed in Claim 4 wherein said radiation is carried out in the presence of oxygen, gas containing elementary oxygen or a substance yielding elementary oxygen.

6. A process as claimed in Claim 5 wherein said radiation is carried out in the presence of a photosensitizer.

References Cited

UNITED STATES PATENTS

| 3,668,091 | 6/1972 | French et al. | 204—158 R |
| 3,668,092 | 6/1972 | French et al. | 204—158 R |

HOWARD S. WILLIAMS, Primary Examiner